(12) United States Patent
Sakashita et al.

(10) Patent No.: US 10,748,397 B2
(45) Date of Patent: Aug. 18, 2020

(54) MONITORING SYSTEM

(71) Applicant: KYOCERA Document Solutions Inc., Osaka (JP)

(72) Inventors: Fumiya Sakashita, Osaka (JP); Yoichi Hiranuma, Osaka (JP); Shoichi Sakaguchi, Osaka (JP); Shohei Fujiwara, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 16/293,861

(22) Filed: Mar. 6, 2019

(65) Prior Publication Data

US 2019/0279477 A1  Sep. 12, 2019

(30) Foreign Application Priority Data

Mar. 9, 2018 (JP) .................... 2018-043318

(51) Int. Cl.
| | |
|---|---|
| *G08B 13/196* | (2006.01) |
| *G06T 7/62* | (2017.01) |
| *G06T 7/254* | (2017.01) |

(52) U.S. Cl.
CPC ........ G08B 13/19613 (2013.01); G06T 7/254 (2017.01); G06T 7/62 (2017.01); G08B 13/19691 (2013.01); *G06T 2207/10016* (2013.01); *G06T 2207/30196* (2013.01); *G06T 2207/30232* (2013.01)

(58) Field of Classification Search
CPC ........ G08B 13/19613; G08B 13/19691; G08B 13/194; G06T 7/62; G06T 7/254; G06T 2207/10016; G06T 2207/30196; G06T 2207/30232
See application file for complete search history.

(56) References Cited

U.S. PATENT DOCUMENTS

2012/0008866 A1\* 1/2012 Halimeh ............ G06K 9/00791
382/190

FOREIGN PATENT DOCUMENTS

JP  2004-128648 A  4/2004

\* cited by examiner

*Primary Examiner* — Nam D Pham
(74) *Attorney, Agent, or Firm* — IP Business Solutions, LLC

(57) ABSTRACT

A monitoring system includes: a camera, a storage section, and a control unit. The camera photographs an object. The storage section stores a first photographed image photographed by the camera and a second photographed image photographed by the camera at a same photographing place of a photographing place of the first photographed image after the photographing of the first photographed image. The control unit includes a processor and, through execution of a control program by the processor, functions as an obstacle determination section and a control section. The obstacle determination section calculates a difference between the first photographed image and the second photographed image and determines, based on the difference, whether or not an obstacle is present in a photographing range of the camera. The control section performs, upon determination by the obstacle determination section that the obstacle is present, processing of reporting results of the determination.

6 Claims, 5 Drawing Sheets

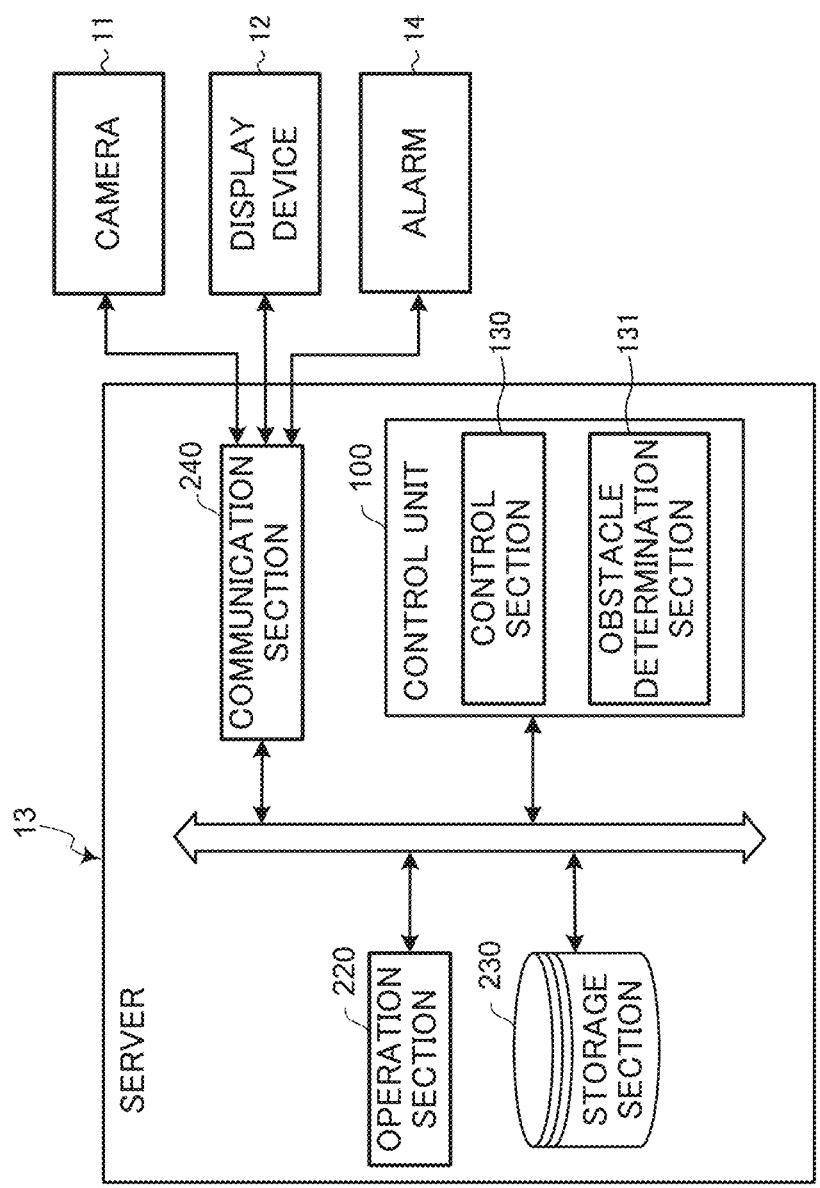

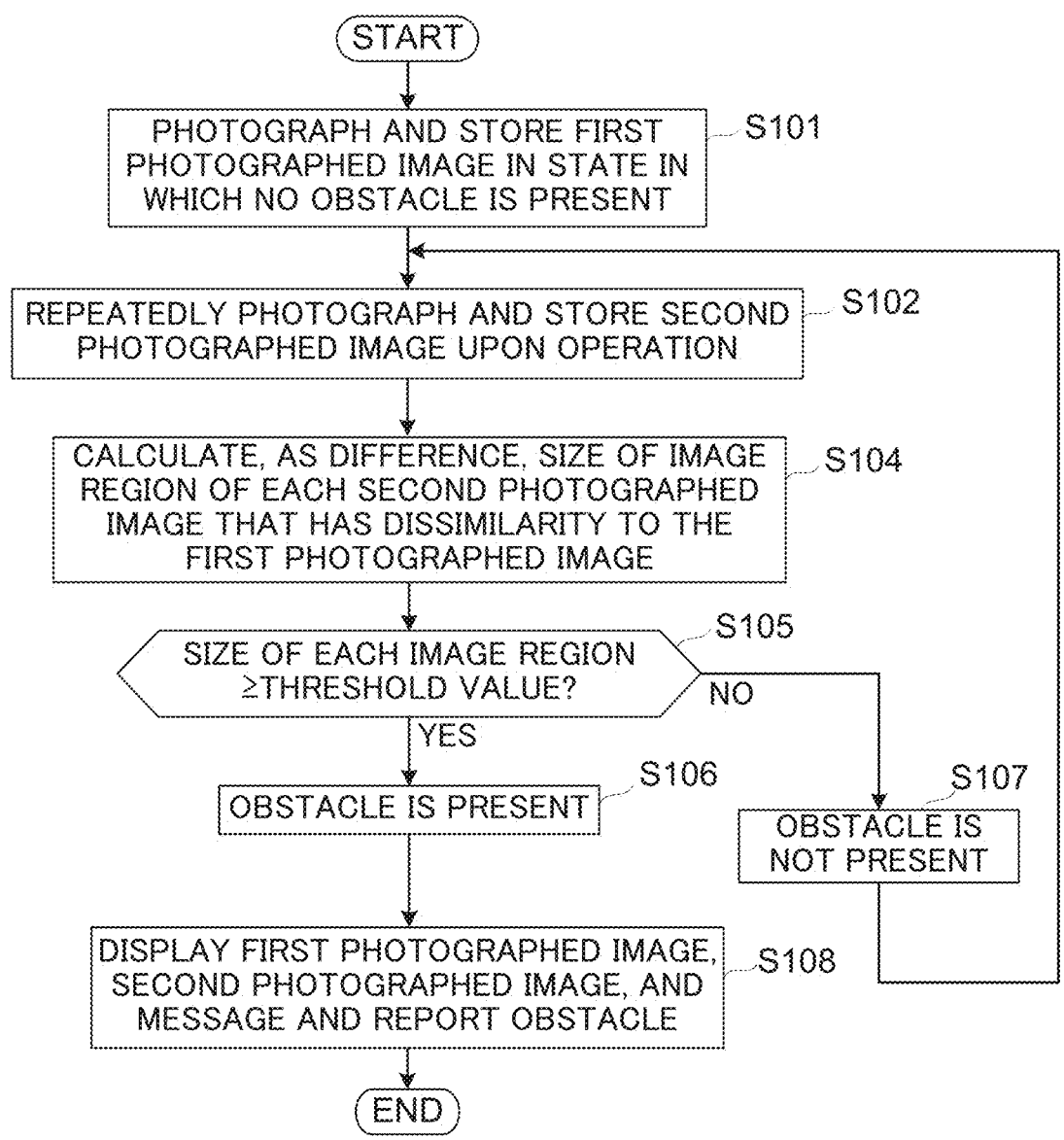

MONITORING SYSTEM

INCORPORATION BY REFERENCE

This application claims priority to Japanese Patent Application No. 2018-043318 filed on Mar. 9, 2018, the entire contents of which are incorporated by reference herein.

BACKGROUND

The present disclosure relates to a monitoring system and more specifically to a technology for detecting an obstacle placed in a region photographed by a camera.

There is a technology of reliably photographing an object, as a target to be monitored, by a camera. For example, with a technology using an object tracking method, in a case where the object has moved to an outside of a photographing range, object detection processing is stopped, a direction in which the object has moved is calculated based on movement information of the object, and the object is photographed by another camera located in a direction in which the object is oriented. Consequently, even in a case where the object has moved to the outside of the photographing range, the object can more accurately be photographed by the camera and an image obtained by the photographing is projected on a monitor, thereby permitting check of an intruding object on the monitor.

SUMMARY

A technology obtained by further improving the technology described above will be suggested as one aspect of the present disclosure.

A monitoring system according to one aspect of the present disclosure includes a camera, a storage section, and a control unit. The camera photographs an object. The storage section stores a first photographed image photographed by the camera and a second photographed image photographed by the camera at a same photographing place of a photographing place of the first photographed image after the photographing of the first photographed image. The control unit includes a processor and, through execution of a control program by the processor, functions as an obstacle determination section and a control section. The obstacle determination section calculates a difference between the first photographed image and the second photographed image and determines, based on the difference, whether or not an obstacle is present in a photographing range of the camera. The control section performs, upon determination by the obstacle determination section that the obstacle is present, processing of reporting results of the determination.

An information processing apparatus according to one aspect of the present disclosure includes a storage section and a control unit. The storage section stores a first photographed image photographed by a camera photographing an object and a second photographed image photographed by the camera at a same place as a place of the first photographed image after the photographing of the first photographed image. The control unit includes a processor and, through execution of a control program by the processor, functions as: an obstacle determination section and a control section. The obstacle determination section calculating a difference between the first photographed image and the second photographed image, and determines, based on the difference, whether or not an obstacle is present in a photographing range of the camera, and the control section performs, upon determination by the obstacle determination section that the obstacle is present, processing of reporting results of the determination.

BRIEF DESCRIPTION OF THE DRAWINGS

FIG. 2 is a block diagram illustrating main sections of a server.

FIG. 3 is a flowchart illustrating procedures of processing of determining whether or not an obstacle is present in a photographing range of a camera.

DETAILED DESCRIPTION

Hereinafter, a monitoring system according to one embodiment of the present disclosure will be described with reference to the drawings.

Figure 1:
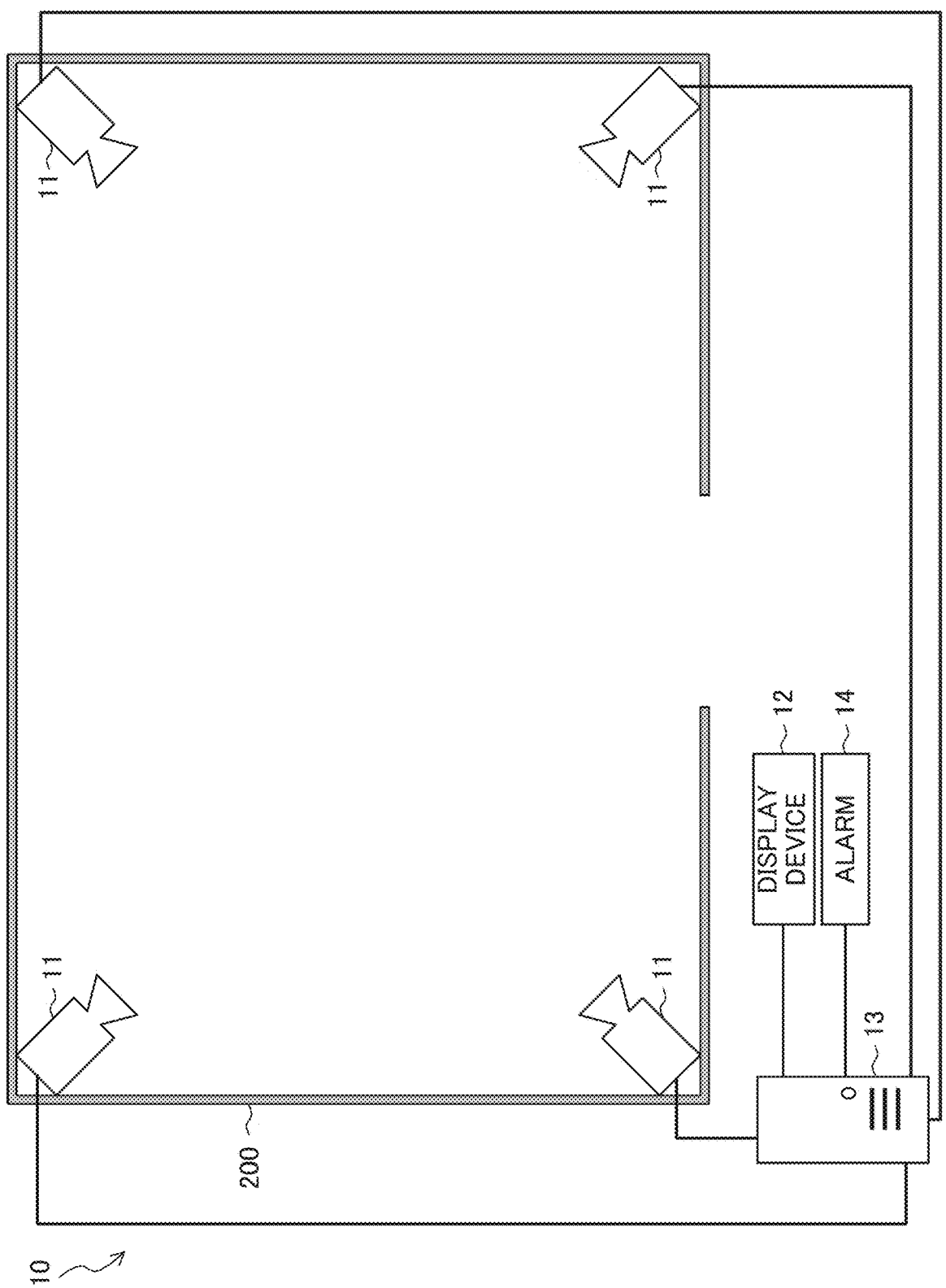
FIG. 1 is a schematic configuration diagram illustrating a monitoring system according to one embodiment of the present disclosure.

FIG. 1 is a schematic configuration diagram of a monitoring system according to one embodiment of the present disclosure. The monitoring system 10 according to one embodiment of the present disclosure includes at least one camera 11, a display device 12, a server 13, and an alarm 14. Note that this embodiment will be described, referring to, as an example, a case where a plurality of, that is, four cameras 11 are present.

The plurality of cameras 11 are respectively installed at positions which permit photographing of moving images and still images all over a room 200.

The display device 12 receives, via the server 13, photographed images respectively transmitted from the cameras 11 and displays the photographed images. For example, the same number of display devices 12 as a number of cameras 11 are included, the photographed images respectively obtained by the cameras 11 are displayed at the separate display devices 12, or a screen of the single display device 12 is divided into a plurality of display regions to display the images in the respective display regions. Note that the display device 12 is one example of a display section in the scope of the claims.

FIG. 2 is a block diagram illustrating main sections of the server 13. The server 13 includes: a control unit 100, an operation section 220, a storage section 230, and a communication section 240. Note that the server 13 is one example of an information processing apparatus in the scope of the claims. The operation section 220 is an input device such as a mouse or a keyboard. The storage section 230 is a storage device such as an HDD or a flash memory.

The communication section 240 is a communication interface including a communication module such as a LAN chip. The communication section 240 is connected in a manner such as to be capable of data transmission and reception between each camera 11 and the display device 12 via a LAN or a network of the Internet. For example, the photographed images respectively transmitted from the cameras 11 are received at the communication section 240 and stored into the storage section 230. Moreover, these photographed images are transmitted from the communication section 240 to the display device 12 by a control section 130 to be described later on.

The control unit 100 is composed of: a processor, a RAM, a ROM, and a dedicated hardware circuit. The processor is, for example, a central processing unit (CPU), an application specific integrated circuit (ASIC), or a micro processing unit (MPU). The control unit 100 functions as the control section 130 and an obstacle determination section 131 as a result of operation performed by the aforementioned processor in accordance with a control program stored in the storage section 230. Note that, however, the aforementioned control section 130 and obstacle determination section 131 may each be formed by a hardware circuit without depending on the operation performed in accordance with the control program by the control unit 100.

The control section 130 is in charge of overall operation control of the server 13. Each of the aforementioned cameras 11 is connected to the server 13, and the control section 130 controls operation of each camera 11. The control section 130 also controls operation of the alarm 14.

The obstacle determination section 131 calculates a difference between (i) a first photographed image photographed by the single camera 11 and (ii) a second photographed image photographed by the camera 11 (the same camera 11) at a same photographing place but at a period which differs from and comes after a period of the photographing of the first photographed image, and based on this difference, determines whether or not an obstacle is present in a photographing range of the camera 11. Note that the obstacle determination section 131 performs this determination independently for each of the photographed images respectively photographed by the cameras 11. Upon determination by the obstacle determination section 131 that the obstacle is present, the control section 130 performs processing of reporting results of this determination.

Next, procedures of processing of determining an obstacle in the photographing range of the camera 11 by the server 13 will be described with reference to a flowchart illustrated in FIG. 3, etc.

Figure 4A:
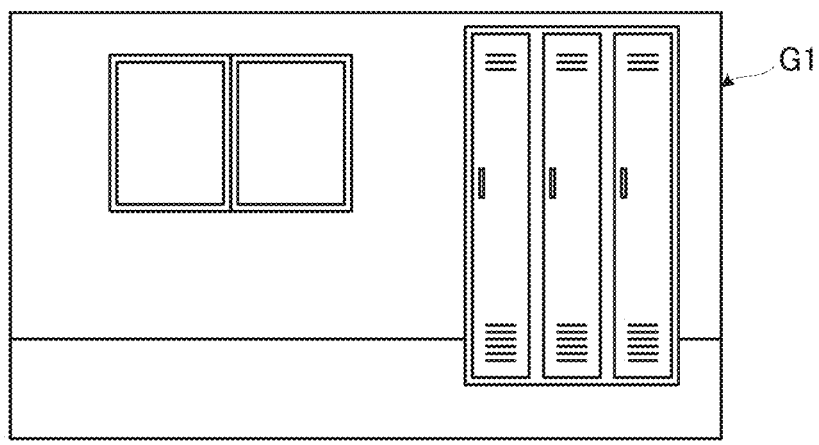
FIG. 4A is a diagram illustrating a first photographed image photographed by the camera in a state in which no obstacle is present.

First, the control section 130 of the server 13 independently causes each of the cameras 11 to photograph a photographable region. A first photographed image G1 photographed by each camera 11 is transmitted from each camera 11 to the server 13. FIG. 4A illustrates an example of the first photographed image G1 provided by one of the plurality of cameras 11. In the server 13, the first photographed image G1 is received at the communication section 240 and each first photographed image G1 is stored into the storage section 230 on an individual camera 11 basis (S101).

In a case where each camera 11 photographs a still image, the first photographed image G1 is photographed upon reception of a photographing instruction from the control section 130 by the camera 11. In a case where each camera 11 photographs a moving image, the camera 11 extracts, as a still image from consecutively photographed moving images, photographing contents at a time point at which the photographing instruction has been received from the control section 130, and the extracted image is provided as the first photographed image G1. Each of the first photographed images G1 respectively photographed by the cameras 11 is stored as an original image into the storage section 230.

Then the control section 130 independently causes each of the cameras 11 to photograph, at the same photographing place as that of the first photographed image G1, the second photographed image photographed at the period which comes after the photographing of the first photographed image. The second photographed image is transmitted from each camera 11 to the server 13. In the server 13, the second photographed image is received at the communication section 240 and each second photographed image is stored into the storage section 230 on an individual camera 11 basis (S102).

Note that the control section 130 independently causes each camera 11 to repeatedly photograph the second photographed image every predefined cycle (for example, every ten minutes). The second photographed images are respectively transmitted from the cameras 11 to the server 13. Upon every storage of the new second photographed image into the storage section 230, the control section 130 erases the oldest second photographed image. Therefore, the second photographed images are sequentially stored into the storage section 230 of the server 13 on an individual camera 11 basis. Then the control section 130 sequentially erases the oldest second photographed image to store a predetermined number (at least two or more and the predefined number is "2" in this embodiment) of the second photographed images in the storage section 230.

Figure 4B:
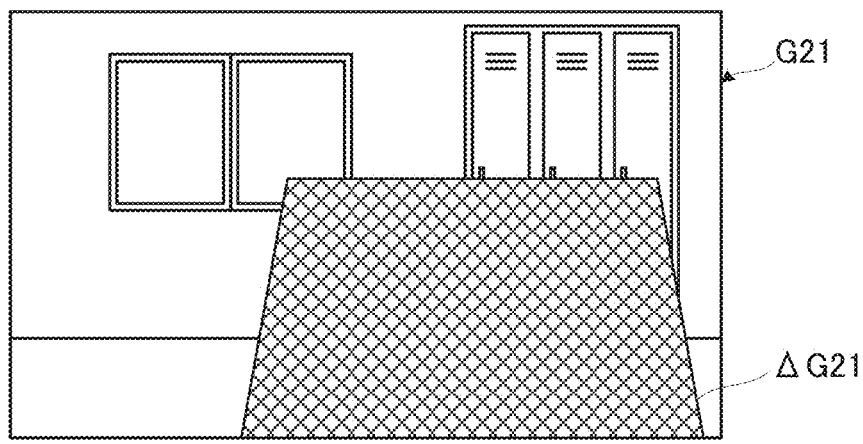
FIGS. 4B and 4C are diagrams respectively illustrating two second photographed images photographed at a predetermined interval by the camera in a state in which an obstacle is present.
Figure 4C:
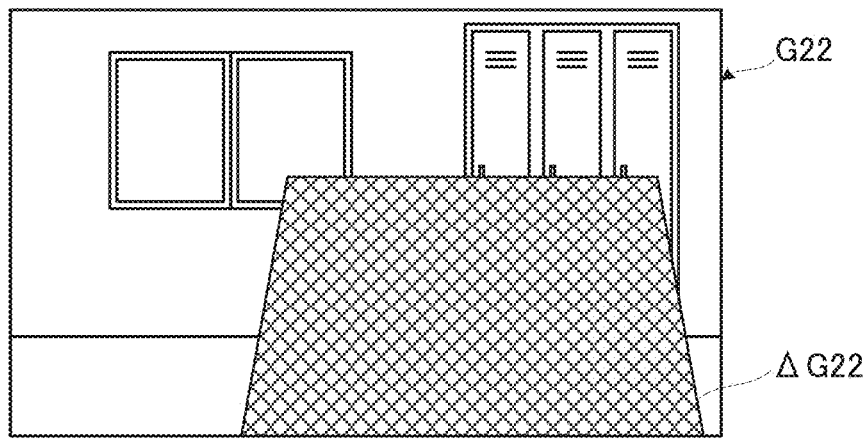

For example, the two second photographed images G21 and G22 photographed in the aforementioned cycle by the given camera 11 and stored into the storage section 230 are those illustrated in FIGS. 4B and 4C. Note that the second photographed image G22 is an image photographed after the second photographed image G21 was photographed. The obstacle determination section 131 extracts, from the second photographed image G21, an image region ΔG21 of the second photographed image G21, the image region ΔG21 being a region having dissimilarity to the first photographed image G1, calculates a size of this image region ΔG21 as a difference between the first photographed image G1 and the second photographed image G21, further extracts, from the second photographed image G22, an image region ΔG22 of the second photographed image G22, the image region ΔG22 being another region having dissimilarity to the first photographed image G1, and calculates a size of this image region ΔG22 as a difference between the first photographed image G1 and the second photographed image G22 (S104). Then the obstacle determination section 131 determines whether or not each of the sizes of the image regions ΔG21 and ΔG22 is equal to or greater than a preset threshold value (S105). At this point, in a case where each of the sizes of the image regions ΔG21 and ΔG22 is equal to or greater than the threshold value (YES in S105), the obstacle determination section 131 determines that an obstacle is present (S106).

Specifically, the obstacle determination section 131 compares the first photographed image G1, photographed by the camera 11 when no obstacle is present, with each of the second photographed images G21 and G22 photographed during monitoring performed by the camera 11 after the photographing of the first photographed image G1. At this point, upon arrangement of the obstacle in the photographing range of the camera 11 during the monitoring performed by the camera 11, the obstacle is included in each of the second photographed images G21 and G22, so that the obstacle determination section 131 extracts, from the respective second photographed images G21 and G22, the image regions ΔG21 and ΔG22 not viewed in the first photographed image G1, and when both of the image regions ΔG21 and ΔG22 are large, determines that the obstacle is present considering the image regions ΔG21 and ΔG22 as obstacle regions.

More specifically, the obstacle determination section 131 sequentially selects each pixel from all pixels forming the first photographed image G1 and also sequentially selects, as a contrast target, pixels in the second photographed image G21 (or G22) located at the same position as that of the pixels selected in the first photographed image G1. Then upon every selection of the pixels from the first photographed image G1 and the second photographed image G21 (or G22) in the manner described above, the obstacle determination section 131 compares pixel values of the respective selected pixels. Further, when the difference between the pixel values is equal to or greater than a defined level, that is, when the pixel values of the both selected pixels clearly differ from each other, the obstacle determination section 131 counts a number of pixels whose pixel values differ as described above. The obstacle determination section 131 performs the selection, comparison, and counting of the pixels only for all the pixels forming the first photographed image G1 and the second photographed image G21 (or G22) (may be performed only for the pixels in a predetermined partial region in the first photographed image G1 and the second photographed image G21 (or G22)).

Consequently, the obstacle determination section 131 calculates a pixel count C21 (or C22) as the one which indicates the size of the image region ΔG21 (or ΔG22) not viewed in the first photographed image G1. That is, the obstacle determination section 131 calculates both the pixel count G21 indicating the size of the image region ΔG21 and the pixel count G22 indicating the size of the image region ΔG22. Then in a case where both of the pixel counts C21 and C22 are equal to or greater than a preset specified value S (for example, the pixel count occupying 10% of all the pixel counts of the first photographed image G1 and the second photographed image G21 (or G22)), the obstacle determination section 131 assumes that the size is equal to or greater than the threshold value and determines that the obstacle is present, and in a case where either of the pixel counts C21 and C22 is less than the aforementioned specified value S, the obstacle determination section 131 assumes that the aforementioned size is less than the threshold value and determines that no obstacle is present.

For example, in a case where at least one of the two second photographed images G21 and G22 becomes substantially equal to the first photographed image G1 illustrated in FIG. 4A, the obstacle determination section 131 determines that at least one of the sizes of the image regions ΔG21 and ΔG22 is less than the threshold value ("No" in S105) and determines that no obstacle is present (S107). In this case, the processing from S102 is repeated thereafter.

Figure 5A:
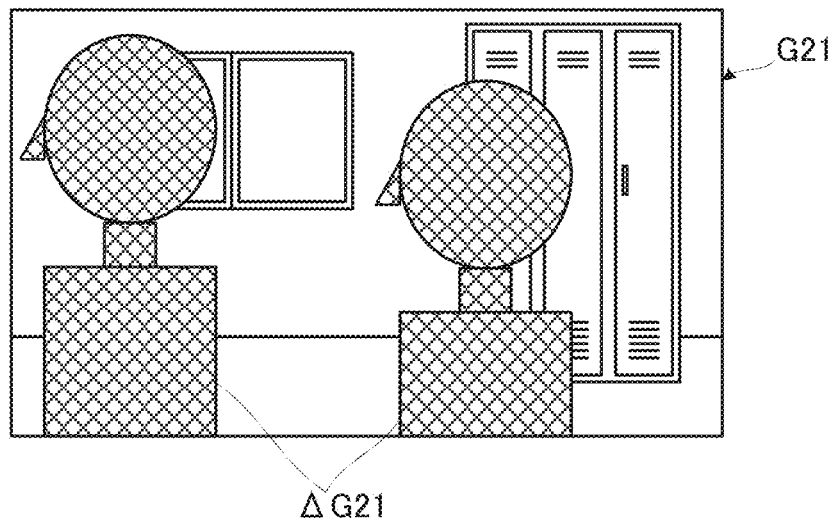
FIGS. 5A and 5B are diagrams respectively illustrating two photographed images photographed at a predetermined interval by the camera during passage of a person.
Figure 5B:
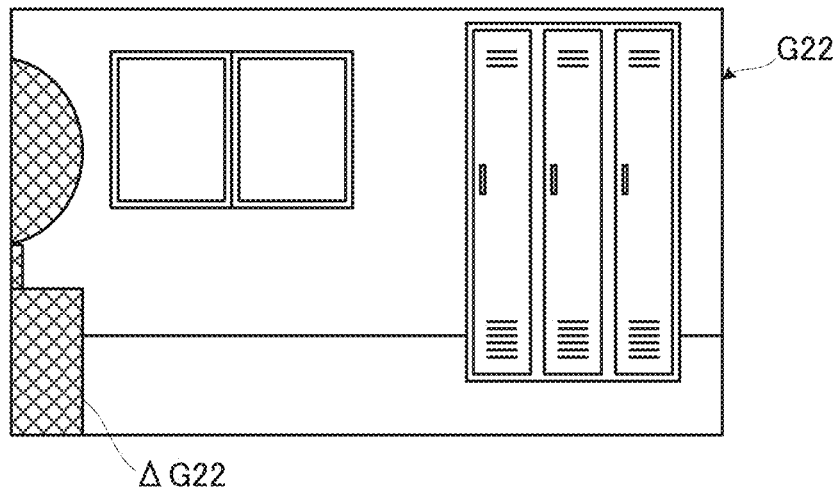

For example, in a case where the first photographed image G1 is as illustrated in FIG. 4A and when people have passed through the photographing range of the camera 11, the second photographed image G21 (see FIG. 5A) and the second photographed image G22 (see FIG. 5B) photographed at a predetermined time interval have different ways of person projection as illustrated in FIGS. 5A and 5B. At this point, the obstacle determination section 131 extracts an image indicating the person in the second photographed image G21 or G22 as the image region ΔG21 or ΔG22 (S104). At this point, the sizes of the image region ΔG21 and the image region ΔG22 differ from each other, and thus the obstacle determination section 131 may determine that the size of the image region ΔG21 or ΔG22 of only either one of the second photographed images G21 and G22 is equal to or greater than the threshold value while the size of another one of the image regions ΔG21 and ΔG22 is less than the threshold value (No in S105). At this point, the obstacle determination section 131 determines that no obstacle is present (S107). That is, this person is not determined as the obstacle.

As described above, in a case where either of the sizes of the image regions ΔG21 and ΔG22 of the second photographed images G21 and G22 photographed at the predetermined time interval has become less than the threshold value, the obstacle determination section 131 assumes that a person or the like has crossed the photographing range of the camera 11 and determines that no obstacle is present.

Note that in a case where either of the sizes of the image regions ΔG21 and ΔG22 of the respective second photographed images G21 and G22 is less than the threshold value, the obstacle determination section 131 may determine that no obstacle is present only when the size of the image region ΔG22 for the second photographed image which is included in the second photographed images G21 and G22 and which is photographed at later time, that is, the second photographed image G22 in this embodiment is less than the aforementioned threshold value, and the obstacle determination section 131 may determine that the obstacle is present in cases other than the aforementioned case.

Moreover, upon determination by the obstacle determination section 131 that the obstacle is present (S106), the control section 130 transmits, to the display device 12 via the communication section 240, identification information indicating which of the plurality of cameras 11 has photographed the photographed image determined to have the obstacle, the first photographed image G1 and the second photographed image G21 or G22 photographed by the aforementioned camera 11, a message indicating that the obstacle is present, etc., and the control section 130 causes the display device 12 to display the identification information, the first photographed image G1 and the second photographed image G21 or G22, the message, etc. or causes the alarm 14 to sound (S108). The control section 130 causes the display device 12 to display the identification information of the camera 11, the first photographed image G1 and the second photographed image G21 or G22, the message, etc. The control section 130 also causes the alarm 14 to generate alarm sound.

At this point, listening to the aforementioned alarm sound or viewing the screen of the display device 12, a manager or the like can judge, based on the identification information of the camera 11, the camera 11 determined to have the obstacle. The manager or the like can, on his or her own, compare the first photographed image G1 with the second photographed image G21 or compare the first photographed image G1 with the second photographed image G22 to thereby judge whether or not the obstacle is present and confirm whether or not the obstacle is placed in the photographing range of the camera 11. Then upon confirmation that the obstacle is placed, the manager or the like can perform operation of, for example, removing the obstacle and changing a direction of the camera 11.

Note that, in a case where the direction of the camera 11 has been changed, it is possible to perform the processing starting with S101 to thereby update the first photographed image G1 as the original image and then determine whether or not the obstacle is present.

As described above, in this embodiment, the obstacle determination section 131 determines whether or not the obstacle is present in the photographing range of the camera 11, and upon determination that the obstacle is present, the display device 12 is caused to display the identification information of the camera 11, the first photographed image and the second photographed image, the message, etc., so that the manager or the like can view the screen of the display device 12 to confirm that the obstacle is placed in the photographing range of the camera 11 or can remove the obstacle or change the direction of the camera 11.

Here, in a case where the obstacle is placed in the photographing region of the camera, a person or an object is hidden by the obstacle and the person or the object to be originally photographed can no longer be photographed. However, a technology described in the background art above can cause another camera to photograph an object as long as a moving direction of the object can be calculated, but when the object can no longer be detected due to the presence of the obstacle, a direction in which the object has moved can no longer be calculated, so that the object cannot be photographed by the camera located in the direction in which the object is present. As described above, no measures for the object placed in the photographing region of the camera has been taken so far, and even when a state arises in which photographing of a person or an object to be monitored cannot be photographed, this state has been left in some cases.

On the contrary, in this embodiment, whether or not the obstacle is present in the photographing range of the camera is determined, and in a case where the obstacle is present, it is possible to report that the obstacle is present Note that in the embodiment described above, the obstacle determination section 131 not only uses the two second photographed images G21 and G22 to determine whether or not the obstacle is present, and upon storage of a new second photographed image into the storage section 230, the control section 130 may perform, on an individual camera 11 basis, processing of sequentially erasing the old second photographed image so as to store only the single second photographed image into the storage section 230, and the obstacle determination section 131 may use only the single second photographed image to extract the image region not viewed in the first photographed image G1 from the aforementioned second photographed image, may determine that the obstacle is present in a case where the size of the extracted image region is equal to or greater than the threshold value, and may determine that no obstacle is present in a case where the size of the extracted image region is less than the threshold value.

Moreover, the obstacle determination section 131 not only performs not only the processing of determining, by use of the two second photographed images G21 and G22, whether or not the obstacle is present, and the control section 130 may perform, on an individual camera 11 basis upon the storage of the second photographed image into the storage section 230, processing of sequentially erasing the old second photographed image so as to store a predefined number (greater than two) of second photographed images into the storage section 230, and the obstacle determination section 131 may use the aforementioned number of second photographed images to extract each image region not viewed in the first photographed image G1 for each of the aforementioned number of second photographed images different from the first photographed image G1, may determine that the obstacle is present in a case where the sizes of all the extracted image regions are equal to or greater than the threshold value, and may determine that no obstacle is present in a case where the size of at least one of the extracted image regions is less than the threshold value.

Further, in a case where the size of at least one of the image regions extracted in the manner described above is less than the threshold value, the obstacle determination section 131 may determine that no obstacle is present only when the size of the aforementioned image region for the second photographed image photographed at the later time is less than the threshold value described above, and may determine that the obstacle is present in other cases.

Moreover, the configuration and the processing illustrated in the embodiment described above with reference to FIGS. 1 to 5 just refer to one embodiment of the present disclosure, and thus the present disclosure is not limited in any way to these configuration and processing.

While the present disclosure has been described in detail with reference to the embodiments thereof, it would be apparent to those skilled in the art the various changes and modifications may be made therein within the scope defined by the appended claims.

What is claimed is:

1. A monitoring system comprising:
   a camera photographing an object;
   a storage section storing a first photographed image photographed by the camera and a second photographed image photographed by the camera at a same photographing place of a photographing place of the first photographed image after the photographing of the first photographed image; and
   a control unit including a processor and, through execution of a control program by the processor, functioning as:
   an obstacle determination section calculating a difference between the first photographed image and the second photographed image and determining, based on the difference, whether or not an obstacle is present in a photographing range of the camera, and
   a control section performing, upon determination by the obstacle determination section that the obstacle is present, processing of reporting results of the determination,
   wherein the obstacle determination section extracts an image region of the second photographed image, the image region being a region having dissimilarity to the first photographed image, and calculates a size of the extracted image region as the difference, and
   the obstacle determination section sequentially selects each pixel from all pixels forming the first photographed image, also sequentially selects, as a contrast target, a pixel of the second photographed image located at a same position as a position of the pixel selected in the first photographed image, upon the every selection, determines whether or not pixel values of the respective pixels selected from the first and second photographed images differ from each other, counts a number of the pixels determined to be different, determines that the size of the image region is equal to or greater than a threshold value in a case where the counted number of the pixels is equal to or greater than a preset specified value, and determines that the size of the image region is less than the threshold value in a case where the counted number of the pixels is less than the specified value.

2. The monitoring system according to claim 1, further comprising
   an information processing apparatus being connected to the camera, wherein
   the information processing apparatus includes the control unit.

3. The monitoring system according to claim 1, further comprising
   a display section, wherein upon the determination by the obstacle determination section that the obstacle is present, the control section causes the display section to display the first photographed image and the second photographed image.

4. A monitoring system comprising:

a camera photographing an object;

a storage section storing a first photographed image photographed by the camera and a second photographed image photographed by the camera at a same photographing place of a photographing place of the first photographed image after the photographing of the first photographed image; and a control unit including a processor and, through execution of a control program by the processor, functioning as:

an obstacle determination section calculating a difference between the first photographed image and the second photographed image and determining, based on the difference, whether or not an obstacle is present in a photographing range of the camera, and a control section performing, upon determination by the obstacle determination section that the obstacle is present, processing of reporting results of the determination, wherein the obstacle determination section extracts an image region of the second photographed image, the image region being a region having dissimilarity to the first photographed image, and calculates a size of the extracted image region as the difference, and the obstacle determination section sequentially selects each pixel for a predefined partial region in the first photographed image, sequentially selects, as the contrast target, the pixel of the second photographed image located at the same position as the position of the pixel selected in the first photographed image, upon the every selection, determines whether or not the pixel values of the respective pixels selected from the first and second photographed images differ from each other, counts the number of the pixels determined to be different, determines that the size of the image region is equal to or greater than the threshold value in a case where the counted number of the pixels is equal to or greater than the specified value, and determines that the size of the image region is less than the threshold value in a case where the counted number of the pixels is less than the specified value.

5. A monitoring system comprising:

a camera photographing an object;

a storage section storing a first photographed image photographed by the camera and a second photographed image photographed by the camera at a same photographing place of a photographing place of the first photographed image after the photographing of the first photographed image; and a control unit including a processor and, through execution of a control program by the processor, functioning as:

an obstacle determination section calculating a difference between the first photographed image and the second photographed image and determining, based on the difference, whether or not an obstacle is present in a photographing range of the camera, and a control section performing, upon determination by the obstacle determination section that the obstacle is present, processing of reporting results of the determination, wherein after the photographing of the first photographed image, the photographing of the second photographed image by the camera is performed at least twice at a time interval and each of the second photographed images is stored into the storage section, and the obstacle determination section calculates a difference between the first photographed image and each of the second photographed images, determines that the obstacle is present in a case where the difference for each of the second photographed images is equal to or greater than the threshold value, and determines that the obstacle is not present in a case where the difference for either of the second photographed images is less than the threshold value.

6. The monitoring system according to claim 5, wherein in a case where the difference for either of the second photographed images is less than the threshold value, the obstacle determination section determines that the obstacle is not present only when the difference for the second photographed image photographed at later time is less than the threshold value.

\* \* \* \* \*